(12) United States Patent
Chen et al.

(10) Patent No.: US 7,712,947 B2
(45) Date of Patent: May 11, 2010

(54) BACKLIGHT MODULE

(75) Inventors: Chun-Yuan Chen, Lujhu Township, Kaohsiung County (TW); Hao-Yuan Hou, Shueilin Township, Yunlin County (TW); Yung-Wen Hsu, Kaohsiung (TW); Shih-Wei Hsieh, Taishan Township, Taipei County (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 11/480,405

(22) Filed: Jul. 5, 2006

(65) Prior Publication Data

US 2007/0165418 A1    Jul. 19, 2007

(30) Foreign Application Priority Data

Jan. 17, 2006    (TW) .............................. 95101813 A

(51) Int. Cl.
  *F21V 7/04*    (2006.01)
  *F21V 21/00*   (2006.01)
  *G09F 13/04*   (2006.01)
  *G09F 13/08*   (2006.01)
  *F21S 4/00*    (2006.01)

(52) U.S. Cl. .................. 362/634; 362/97.1; 362/217.12; 362/217.16; 362/633; 362/225

(58) Field of Classification Search ......... 362/632–634, 362/581, 217.1–217.17, 225, 97.1; 349/58, 349/60
See application file for complete search history.

(56) References Cited

U.S. PATENT DOCUMENTS

| | | | | |
|---|---|---|---|---|
| 5,211,464 A | * | 5/1993 | Bohmer | 362/634 |
| 5,253,089 A | * | 10/1993 | Imai | 349/65 |
| 5,485,354 A | * | 1/1996 | Ciupke et al. | 362/619 |
| 5,550,676 A | * | 8/1996 | Ohe et al. | 359/599 |
| 6,132,053 A | * | 10/2000 | Sendova | 362/626 |
| 6,464,372 B1 | * | 10/2002 | Dudek et al. | 362/222 |
| 6,590,626 B1 | * | 7/2003 | Suzuki et al. | 349/70 |
| 6,935,766 B2 | * | 8/2005 | Ato | 362/633 |
| 7,261,434 B2 | * | 8/2007 | Miyamoto | 362/218 |
| 7,270,462 B2 | * | 9/2007 | Yu et al. | 362/609 |
| 7,278,770 B2 | * | 10/2007 | Lu | 362/604 |
| 7,281,834 B2 | * | 10/2007 | Sinofsky | 362/608 |
| 2003/0164815 A1 | * | 9/2003 | Nagatani | 345/102 |

(Continued)

FOREIGN PATENT DOCUMENTS

CN    1752807    3/2006

*Primary Examiner*—Jong-Suk (James) Lee
*Assistant Examiner*—David J Makiya
(74) *Attorney, Agent, or Firm*—WPAT, P.C.; Anthony King

(57) ABSTRACT

A backlight module for use in a planar display panel is disclosed. The backlight module comprises a lamp tube set, a light guide plate and a positioning body. The lamp tube set comprises a lamp housing and at least a lamp tube. An optical film is disposed on the light guide plate. The light guide plate has a side for insetting the light guide plate into the lamp tube set. Furthermore, the positioning body is disposed on an inner wall of the lamp housing and comprises at least a flange against the side. The light guide plate is positioned to contact the positioning body so as to form gaps between the at least a lamp tube and the light guide plate or between the optical film and the lamp housing.

13 Claims, 4 Drawing Sheets

U.S. PATENT DOCUMENTS

| | | | |
|---|---|---|---|
| 2004/0239829 A1* | 12/2004 | Yu et al. | 349/61 |
| 2004/0264198 A1* | 12/2004 | Kim | 362/296 |
| 2005/0117323 A1* | 6/2005 | King | 362/31 |
| 2005/0248936 A1* | 11/2005 | Lee et al. | 362/217 |
| 2005/0255784 A1* | 11/2005 | Hayashi et al. | 445/39 |
| 2006/0018131 A1* | 1/2006 | Kim | 362/634 |

* cited by examiner

BACKLIGHT MODULE

FIELD OF THE INVENTION

The present invention generally relates to a backlight module, and more particularly to a technical field that utilizes a positioning body to be disposed in a lamp tube set.

BACKGROUND OF THE INVENTION

In the prior arts, although in the same backlight modules, different companies for manufacturing backlight modules may also have different assembly procedures. Because the different assembly procedures and differences in assembling techniques, different errors are then generated. The errors in assembling can easily influence the thermal expansion spaces for an optical film of the backlight module to further cause worse optical quality.

Therefore, if there is still a predetermined distance for positioning the lamp tube set and the light guide plate to satisfy the backlight module manufactured by different companies and the different assembly procedures, the required thermal expansion spaces are further provided for the optical film. The contribution would truly help the backlight module in the assembly procedures.

Referring to FIG. 1, a schematic diagram illustrates a conventional backlight module. In FIG. 1, the backlight module 1 includes a light guide plate 10, an optical film 11 and a lamp tube set 12. The light guide plate 10 can be inserted into the lamp tube set 12. The optical film 11 can be disposed on the light guide plate 10. In assembling the backlight module 1, in order to reduce influencing optical quality, a predetermined gap D1 is prepared for thermal expansion spaces generated by the optical film 11.

Referring to FIG. 2, another schematic diagram illustrates a conventional backlight module. In FIG. 2, the backlight module 2 as the same as shown in FIG. 1 includes the light guide plate 10, the optical film 11 and the lamp tube set 12. In assembling the backlight module 2, if a distance for the light guide plate 10 inserted into the lamp tube set 12 is too deep, the gap is reduced to become D2. The required thermal expansion spaces for the optical film 11 are insufficient, thereby changing the shape of the optical film 11. The optical image quality is getting worse. In addition, because the light guide plate 10 is so close to the lamp tubes (not shown) within the lamp tube set 12, the shape of the light guide plate 10 is changed due to heat energy generated by the lamp tubes. Furthermore, while performing an impact experiment for the lamp tubes, the lamp tubes may be hit by the light guide plate to cause broken.

SUMMARY OF THE INVENTION

Accordingly, the object of the present invention is to provide a backlight module. When the backlight module is assembled, a light guide plate is inserted into a lamp tube set to achieve a gap so as to provide a thermal expansion space required for an optical film. The worse optical quality can be avoided for the conventional backlight module when the distance for the light guide plate inserted into the lamp tube set is too deep to influence the thermal expansion space for the optical film.

In accordance with the backlight module of the present invention includes a lamp tube set, a light guide plate and a positioning body. The lamp tube set has a lamp housing and a first lamp tube. An optical film is disposed on the light guide plate. The light guide plate also has a side for inserting the light guide plate into the lamp tube set. In addition, the positioning body is disposed on an inner wall of the lamp housing and has a first flange against the side. The first flange vertically extends from a base. The light guide plate is positioned to contact with the positioning body so as to form a gap between the first lamp tube and the light guide plate. The light guide plate is positioned to contact with the positioning body so as to form a gap between the optical film and the lamp housing. A reflector is further disposed on the inner wall of the lamp housing. The base of the positioning body can be disposed on the lamp housing.

Moreover, the positioning body can be modified for its shape according to the design for the interior of the lamp tube set. The positioning body further comprises a second flange vertically extended from the base. The first lamp tube in the lamp tube set is disposed between the first flange and the second flange.

Furthermore, the lamp tube set further comprises a second lamp tube separated from the first lamp tube by the first flange.

Other features and advantages of the present invention and variations thereof will become apparent from the following description, drawings, and claims.

DETAILED DESCRIPTION OF THE PREFERRED EMBODIMENTS

To make it easier for our examiner to understand the objective of the invention, its innovative features and performance, a detailed description and technical characteristics of the present invention are described together with the drawings as follows.

Figure 1:
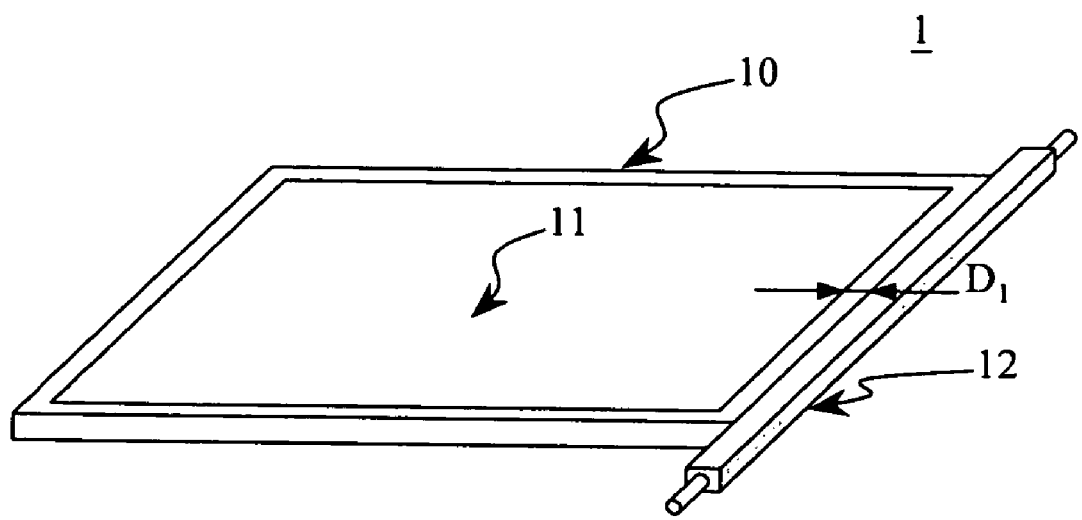
FIG. 1 is a schematic diagram illustrating a conventional backlight module.
Figure 2:
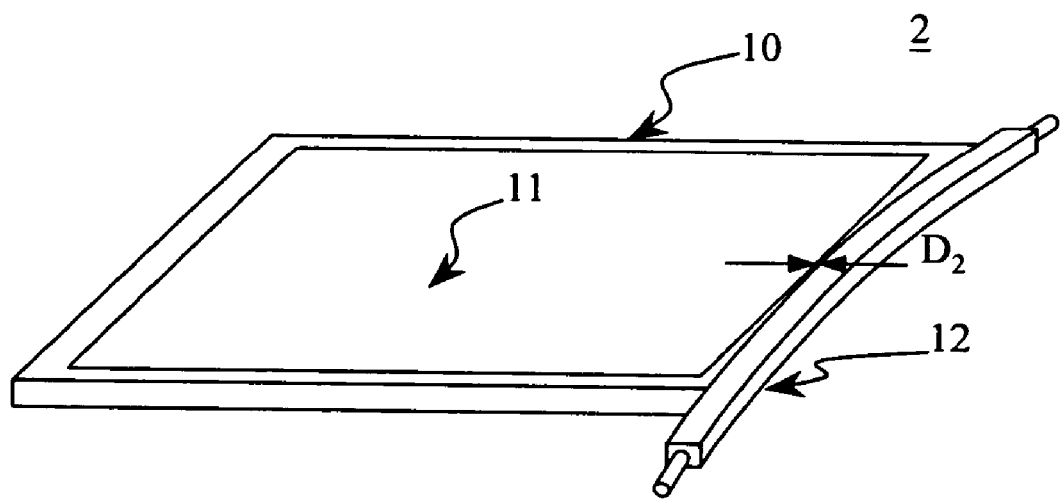
FIG. 2 is another schematic diagram illustrating a conventional backlight module.
Figure 3:
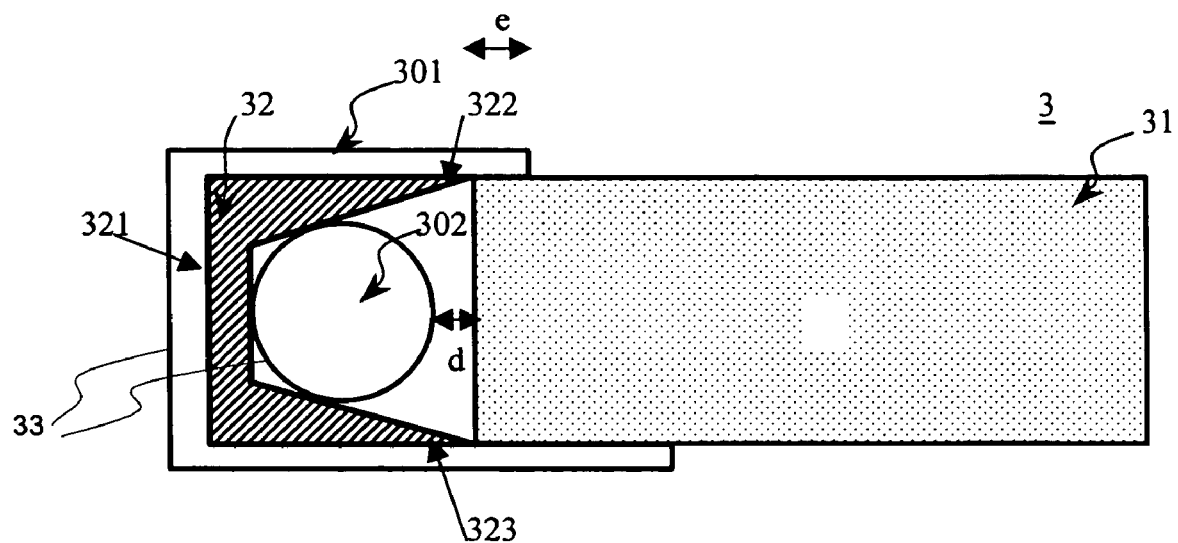
FIG. 3 is a schematic diagram illustrating a backlight module according to a preferred embodiment of the present invention.

Referring to FIG. 3, a schematic diagram illustrates a backlight module according to a preferred embodiment of the present invention. In FIG. 3, the backlight module 3 comprises a lamp tube set 33, a light guide plate 31 and a positioning body 32. The lamp tube set 33 comprises a lamp housing 301 and a first lamp tube 302. An optical film (not shown) is disposed on the light guide plate 31. The positioning body 32 further comprises a base 321, a first flange 322 and a second flange 323. The base 321 is disposed on the lamp housing 301. The first flange 322 and the second flange 323 vertically extend from the base 321. The light guide plate 31 is positioned to contact the positioning body 32 so as to form a gap d between the first lamp tube 302 and the light guide plate 31. The light guide plate 31 is positioned to contact the positioning body 32 so as to form another gap e between the optical film and the lamp housing 301. The gap d can avoid the light guide plate 31 to hit the first lamp tube 302 to damage the first lamp tube 302 while assembling or influencing by an external force. In addition, the gap d can prevent shape changes from heat generated by the first lamp tube 302 when the light guide plate 31 is so close to the first lamp tube 302. The gap e ensures that the optical film on the light guide plate 31 keeps required thermal expansion spaces based on actual demands.

Figure 4:
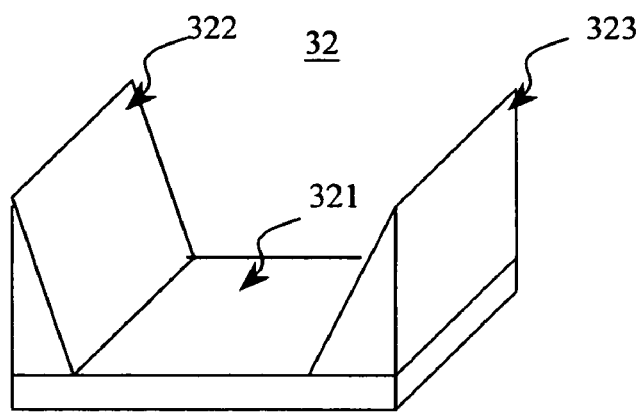
FIG. 4 is a perspective drawing illustrating a positioning body according to a preferred embodiment of the present invention.

Referring to FIG. 4, a perspective drawing illustrates a positioning body according to a preferred embodiment of the present invention. In FIG. 4, the positioning body 4 comprises a base 321, a first flange 322 and a second flange 323. The first flange 322 and the second flange 323 extend from the base 321. It should be noted that the first flange 322 and the second flange 323 entirely cover the fist lamp tube 302 as shown in FIG. 3 based on demands of a designer. Alternatively the first flange 322 and the second flange 323 do not cover the fist lamp tube 302 as shown in FIG. 3. The first lamp tube 302 is merely disposed between the first flange 322 and the second flange 323.

Figure 5:
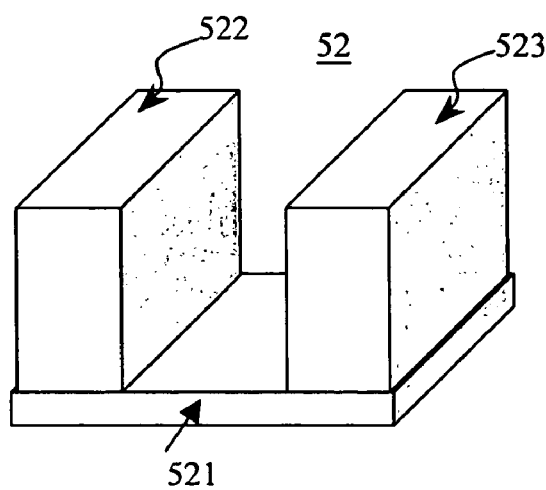
FIG. 5 is a perspective drawing illustrating a positioning body according to another preferred embodiment of the present invention.

Referring to FIG. 5, a perspective drawing illustrates a positioning body according to another preferred embodiment of the present invention. As the same as FIG. 4, the positioning body 52 also comprises a base 521, a first flange 522 and a second flange 523. The first flange 522 and the second flange 523 extend from the base 521. It should be noted that the first flange 522 and the second flange 523 entirely cover the fist lamp tube 302 as shown in FIG. 3 based on demands of a designer. Alternatively the first flange 522 and the second flange 523 do not cover the fist lamp tube 302 as shown in FIG. 3. The first lamp tube 302 is merely disposed between the first flange 522 and the second flange 523.

Figure 6:
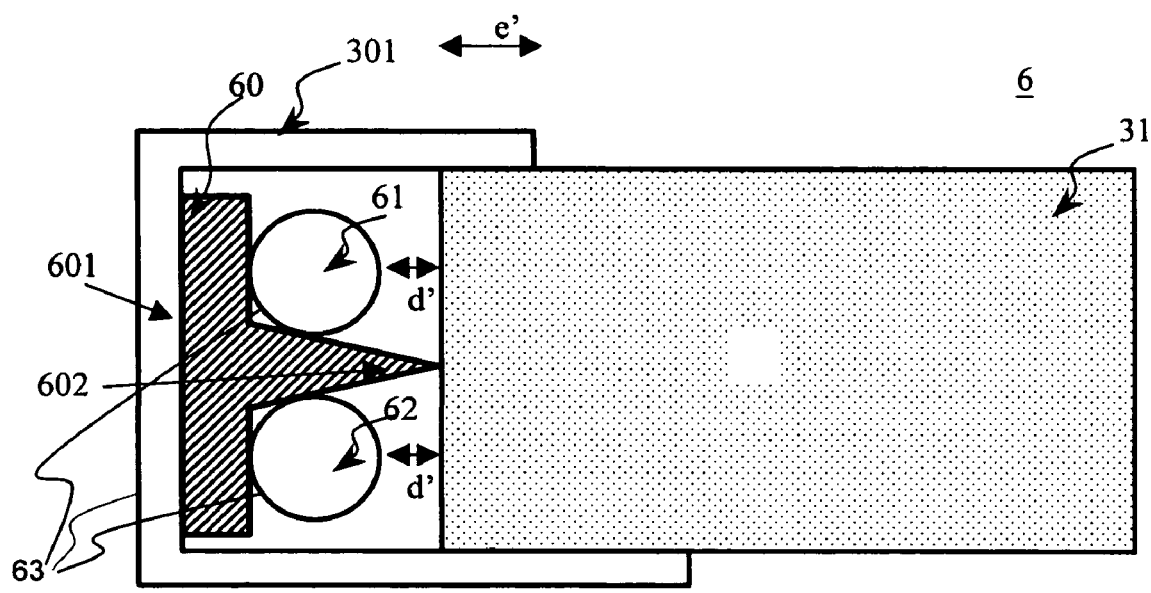
FIG. 6 is a schematic diagram illustrating a backlight module according to another preferred embodiment of the present invention.

Referring to FIG. 6, a schematic diagram illustrates a backlight module according to another preferred embodiment of the present invention. In FIG. 6, the backlight module 6 comprises a lamp tube set 63, the light guide plate 31 and a positioning body 60. The lamp tube set 63 further comprises a second lamp tube 62 separated from a first lamp tube 61 by a first flange 602. An optical film (not shown) is disposed on the light guide plate 31. The positioning body 60 comprises a base 601 disposed on the lamp housing 301. In addition, the backlight module further comprises a reflector disposed on an inner wall of the lamp housing 301. The first flange 602 vertically extends from the base 601. The light guide plate 31 is positioned to contact with the positioning body 60 so as to form a gap d' between the first lamp tube 61/the second lamp tube 62 and the light guide plate 31. The light guide plate 31 is positioned to contact with the positioning body 60 so as to form another gap d' between the optical film and the lamp housing 301. The gap d' can avoid the light guide plate 31 to hit the first lamp tube 61 and the second lamp tube 62 to damage the first lamp tube 61 and the second lamp tube 62 while assembling or influencing by an external force. In addition, the gap d' can prevent shape changes from heat generated by the first lamp tube 61 and the second lamp tube 62 when the light guide plate 31 is so close to the first lamp tube 61 and the second lamp tube 62. The gap e' ensures that the optical film on the light guide plate 31 keeps required thermal expansion spaces based on actual demands.

Figure 7:
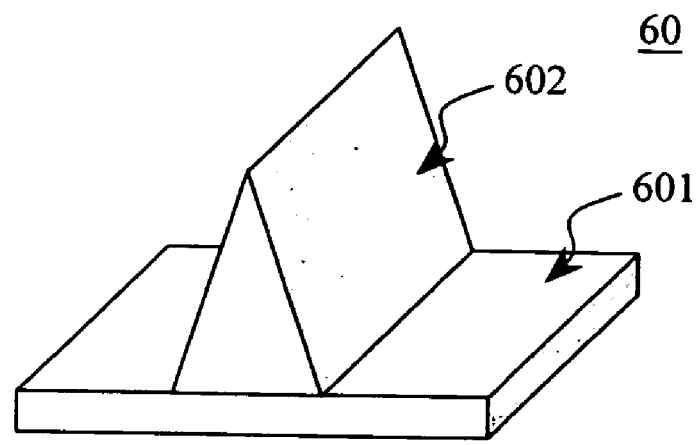
FIG. 7 is a perspective drawing illustrating a positioning body for at least two lamp tubes according to a preferred embodiment of the present invention.

Referring to FIG. 7, a perspective drawing illustrates a positioning body for at least two lamp tubes according to a preferred embodiment of the present invention. In FIG. 7, the positioning body 60 comprises the base 601 disposed on the lamp housing. The first flange 602 vertically extends from the base 601. It should be noted that flanges (not shown) further extend from the base 601 of the positioning body 60 based on demands of the designer. Therefore, the flanges could cooperate with the first flange 602 to cover the first lamp tube 61 and the second tube 62 as shown in FIG. 6 respectively.

Figure 8:
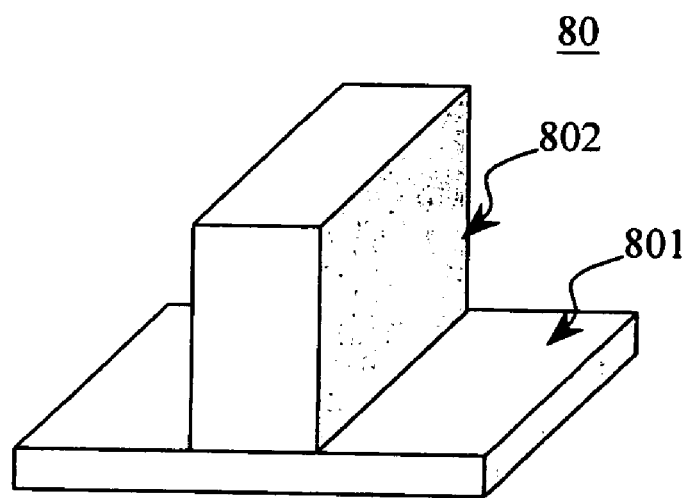
FIG. 8 is a perspective drawing illustrating a positioning body for at least two lamp tubes according to a further preferred embodiment of the present invention.

Referring to FIG. 8, a perspective drawing illustrates a positioning body for at least two lamp tubes according to a further preferred embodiment of the present invention. As the same as FIG. 7, the positioning body 80 also comprises a base 801 disposed on the lamp housing. A first flange 802 extends from the base 801. It should be noted that flanges (not shown) further extend from the base 801 of the positioning body 80 based on demands of the designer. Therefore, the flanges could cooperate with the first flange 802 to cover the first lamp tube 61 and the second tube 62 as shown in FIG. 6 respectively.

In the above embodiments, the first flange and the second flange can be shown in the aforesaid figures. However, the thickness and the shape for the flanges can be changed based on the designed spaces or the design requirements. For instance, other cylinders or cones can be applied to the flanges of the present invention.

In the present invention, the combination way for the positioning body or the base combined with the lamp housing has the diversity. For instance, the positioning body or the base can be fixed on the surface of the lamp housing by using glue. The positioning body or the base can also be combined with the lamp housing by fastening without certain restrictions.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the description above, the present invention is novel and useful and definite enhances the performance over the conventional structure and further complies with the patent application requirements and is submitted to the Patent and Trademark Office for review and granting of the commensurate patent rights.

What is claimed is:

1. A backlight module, comprising:

a lamp tube set having a lamp housing and a first lamp tube;

a light guide plate having a side for inserting said light guide plate into said lamp tube set; and a non-perforated positioning body having a base, a first flange, and a second flange where the outer walls of the positioning body are insertably coupled to an inner wall of said lamp housing, whereby said first lamp tube directly contacts a sidewall of said first flange and a sidewall of said second flange; said light guide plate positioned to contact said non-perforated positioning body to form a protective gap between said first lamp tube and said light guide plate; said protective gap extending along the length of said first lamp tube, wherein said non-perforated positioning body is movable from said lamp housing, wherein said first flange and said second flange each having a slope vertically diverging outwardly from said base, wherein a cross sectional area of said first flange and said second flange each decrease as said flanges vertically extends outwardly from said base toward said light guide plate.

2. The backlight module of claim 1, further comprising an optical film disposed on said light guide plate.

3. The backlight module of claim 1, further comprising a reflector disposed on said inner wall.

4. The backlight module of claim 2, wherein said light guide plate is positioned to contact with said positioning body so as to form a protective gap between said optical film and said lamp housing.

5. The backlight module of claim 1, wherein said first lamp tube is disposed between said first flange and said second flange to form a first space and a second space respectively.

6. The backlight module of claim 5, wherein said first flange and said second flange vertically extend from said base.

7. The backlight module of claim 1, wherein said lamp tube set further comprises a second lamp tube separated from said first lamp tube by said first flange.

8. The backlight module of claim 1, wherein said cross sectional area of said first flange continuously decreases as said first flange vertically extends outwardly from said base toward said light guide plate, and a sharp edge is formed on a top portion of said first flange.

9. The backlight module of claim 1, wherein said sidewall of said first flange and said base are entirely flat, and said sidewall of said first flange and said base converge to form an angled corner.

10. The backlight module of claim 9, wherein said angled corner is an obtuse angle.

11. The backlight module of claim 1, wherein a distance between said sidewall of said first flange and said sidewall of said second flange increases along an entire length of said sidewall of said first flange and an entire length of said sidewall of said second flange in an outward direction away from said base.

12. The backlight module of claim 5, wherein first lamp tube contacts said first flange at a first contact area, said first lamp tube contacts said base at a second contact are and said first lamp tube contacts said second flange at a third contact area.

13. The backlight module of claim 12, wherein said first space is disposed between said first contact area and the second contact area and said second space is disposed between said second contact area and said third contact area.

* * * * *